Oct. 7, 1958 R. T. CELLA 2,855,305
METHOD OF PREPARING A FOOD PRODUCT
Filed July 1, 1957
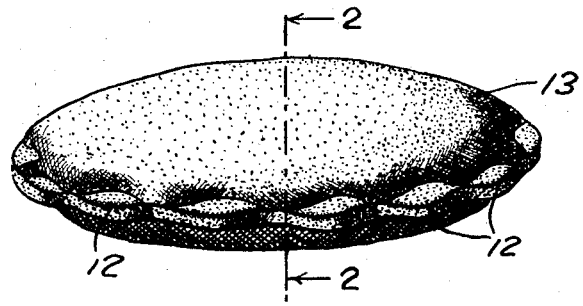
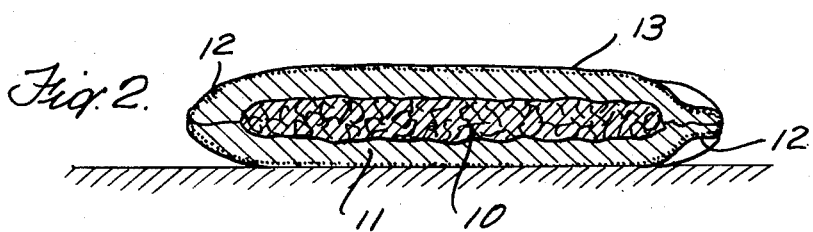
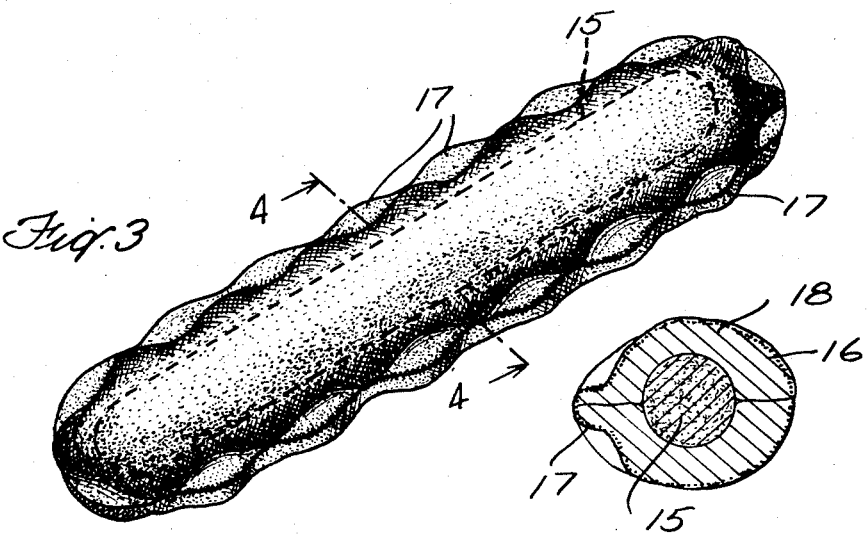
INVENTOR
RICHARD T. CELLA
BY
ATTORNEY

United States Patent Office 2,855,305
Patented Oct. 7, 1958

2,855,305

METHOD OF PREPARING A FOOD PRODUCT

Richard T. Cella, Trenton, N. J.

Application July 1, 1957, Serial No. 669,054

1 Claim. (Cl. 99—1)

This invention relates to a food product and more particularly to a product of the hamburger or frankfurter type wherein the meat product is enclosed in an edible container or holder.

An object is to provide a product of the above type having novel and improved characteristics.

Another object is to provide such a product wherein the container or holder is suited for handling by the consumer.

Another object is to provide a product of the above type wherein the meat and the container are cooked as a unit.

Various other objects and advantages will be apparent as the nature of the invention is more fully disclosed.

In a specific embodiment, the container or holder is made of a potato base which is prepared in a form suitable for easy handling and is wrapped around the hamburger or frankfurter to form a complete closure. The product thus prepared is cooked as a unit to convert the envelope to a stiff, dry form which is easily held by the consumer while eating the product.

As a specific example the base may be composed of 80% to 90% potato dough consisting of boiled and mashed potatoes to which is added from 10% to 20% of partially boiled corn meal. The mass is thoroughly mixed to form a pasty dough which may be extruded or rolled into a strip, for example, some 6 inches wide by ¼ inch thick.

In some instances bread crumbs may be substituted for the cornmeal. For flavor ground or chopped onion may be added to the dough, with or without mustard, according to the flavor desired.

The dough ribbon is then cut into saucers of the desired shape, round for hamburgers or elongated for frankfurters, and the saucers are deep fried for about one minute in deep fat to harden them sufficiently for handling. They are then cooled and dried and frozen if necessary for future use.

For consumption the hamburgers or frankfurters are placed between appropriately shaped, partially filled saucers as above described, the edges are pinched or crimped together to make a complete closure or holder, and the unit is deep fried in deep fat for a suitable length of time and at a temperature to bring the material to the desired consistency and produce a hard or rigid golden brown exterior shell which is easily handled for eating the product.

The time of frying may be selected to produce rare, medium or well done meat or for medium or well done meat the hamburger meat or frankfurter may be partially cooked before being placed in the dough mix.

A typical product is illustrated in the accompanying drawing wherein:

Fig. 1 is a perspective view of a hamburger product;
Fig. 2 is a section taken on the line 2—2 of Fig. 1;
Fig. 3 is a perspective view of a frankfurter product; and
Fig. 4 is a section taken on the line 4—4 of Fig. 3.

Referring to the drawing more in detail, the hamburger of Figs. 1 and 2 is shown as composed of a meat portion 10 encased in a fried dough mix 11 which is pinched or crimped around the edges 12 to form a complete closure and has an outer skin or layer 13 which is hard and rigid for handling.

The frankfurter of Figs. 3 and 4 is composed of frankfurter meat 15 surrounded by a cooked dough mix 16 having a crimped outer edge 17 and an outer skin or layer 18 similar to the layer 13 above described.

The product may of course take other forms or shapes and may be applied to other meat products or sandwich fillings. A specific embodiment has been shown and described for purposes of illustration only.

What is claimed is:

The method of preparing a food product which comprises making a dough composed of a mixture of from 80% to 90% of mashed boiled potatoes and from 10% to 20% of boiled corn meal, cutting said dough into a shape of predetermined size, partially frying said dough shape in deep fat for about one minute whereby the said dough shape is sufficiently hardened to enable easy handling thereof, encasing a meat product with said partially fried dough and deep frying the same to a state wherein the meat is cooked and the dough forms a non-doughy holder having a hard surface suitable for handling by the consumer.

References Cited in the file of this patent

UNITED STATES PATENTS

| | | |
|---|---|---|
| 1,492,603 | Matson | May 6, 1924 |
| 1,596,652 | Giovannetti | Aug. 17, 1926 |
| 1,597,979 | James et al. | Aug. 31, 1926 |
| 1,706,491 | Jenkins | Mar. 26, 1929 |
| 2,027,596 | Kurz | Jan. 14, 1936 |
| 2,097,471 | Scharsch | Nov. 2, 1937 |
| 2,433,622 | Novak | Dec. 20, 1947 |

OTHER REFERENCES

"Culinary Arts Institute Encyclopedic Cook Book," 1948, by Ruth Berolzheimer, published by Culinary Arts Institute, Chicago, pp. 496 and 497.